US006806424B2

(12) United States Patent
Gerving

(10) Patent No.: US 6,806,424 B2
(45) Date of Patent: Oct. 19, 2004

(54) CONNECTING TERMINAL

(75) Inventor: Karsten Gerving, Bonn (DE)

(73) Assignee: Moeller GmbH, Bonn (DE)

( * ) Notice: Subject to any disclaimer, the term of this patent is extended or adjusted under 35 U.S.C. 154(b) by 52 days.

(21) Appl. No.: 10/276,563

(22) PCT Filed: Apr. 28, 2001

(86) PCT No.: PCT/EP01/04808

§ 371 (c)(1),
(2), (4) Date: Nov. 14, 2002

(87) PCT Pub. No.: WO01/89037

PCT Pub. Date: Nov. 22, 2001

(65) Prior Publication Data

US 2004/0020678 A1 Feb. 5, 2004

(30) Foreign Application Priority Data

May 16, 2000 (DE) ........................................ 100 23 851

(51) Int. Cl.[7] ................................................ H02G 3/18

(52) U.S. Cl. .......................... 174/59; 174/58; 174/135; 220/3.8; 361/622

(58) Field of Search ........................... 174/58, 59, 135; 220/3.8; 439/367, 535; 361/622; 248/906

(56) References Cited

U.S. PATENT DOCUMENTS

| | | | | |
|---|---|---|---|---|
| 5,174,768 A | * 12/1992 | Hewison et al. | .............. | 439/95 |
| 5,298,700 A | * 3/1994 | Champagne et al. | ...... | 200/19.2 |
| 6,659,439 B1 | * 12/2003 | Baumgartner et al. | ........ | 269/43 |

FOREIGN PATENT DOCUMENTS

| | | |
|---|---|---|
| DE | 1590937 | 4/1970 |
| DE | 2704057 | 8/1978 |
| DE | 3504317 | 8/1986 |
| DE | 3617113 | 9/1988 |
| DE | 3510588 | 9/1990 |
| DE | 9315474 | 2/1994 |
| DE | 4321067 | 7/1994 |
| DE | 4135713 | 11/1994 |
| DE | 19506859 | 8/1996 |
| DE | 29619139 | 2/1997 |
| DE | 19630860 | 10/1997 |
| DE | 19756751 | 4/1999 |

* cited by examiner

*Primary Examiner*—Dhiru R Patel
(74) *Attorney, Agent, or Firm*—Davidson, Davidson & Kappel, LLC

(57) ABSTRACT

A connecting terminal for switching device includes at least one receiving device configured to interchangeably receive either of a base contact element for a screw connection or a module for a spring-clamping device. A receiving shaft configured to engage the module is provided. The module includes an open mounting side configured for mounting the spring-clamping device.

19 Claims, 12 Drawing Sheets

1b

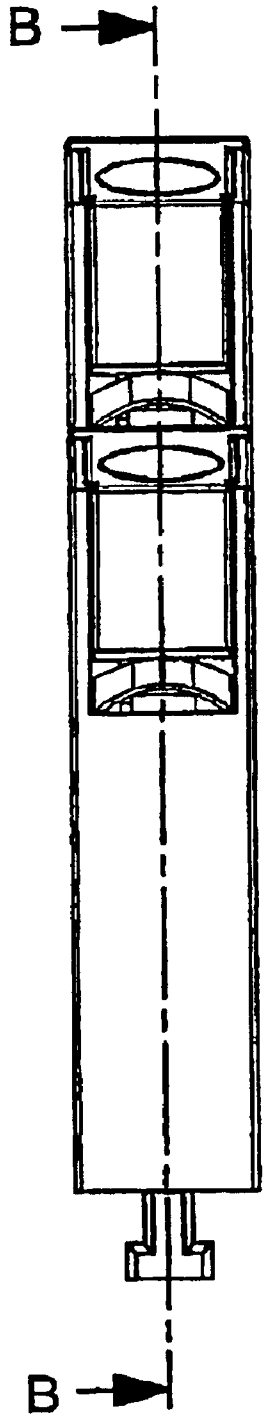
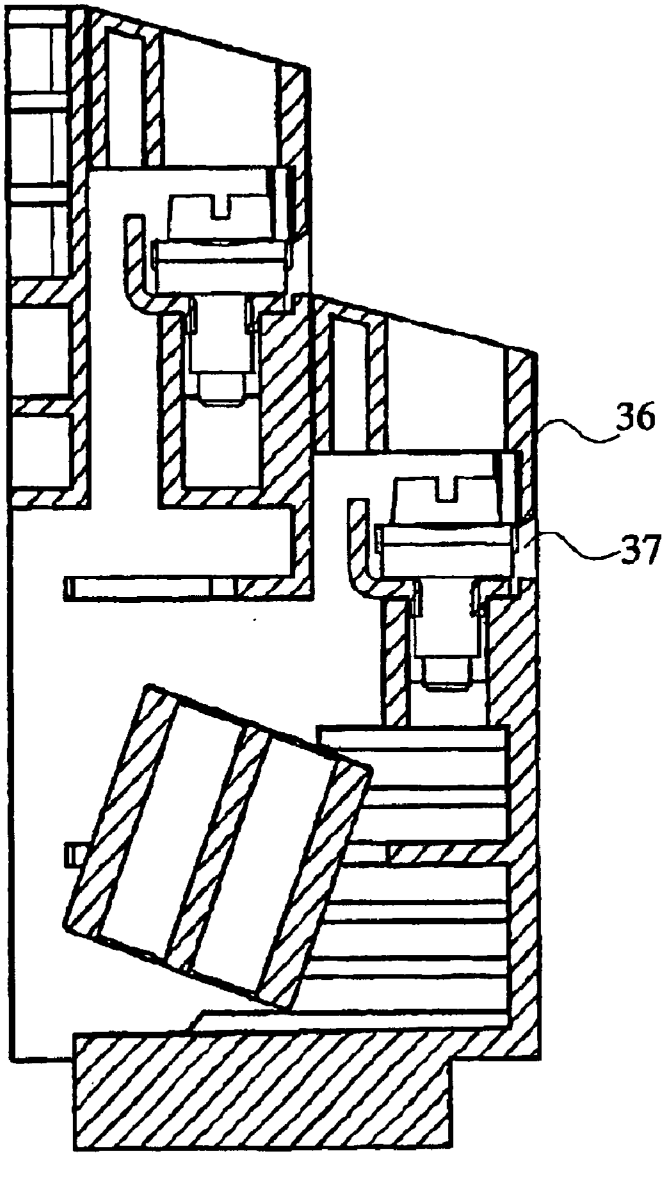
*Fig. 17*
*Fig. 18*

CONNECTING TERMINAL

BACKGROUND OF THE INVENTION

The present invention relates to a connecting terminal having at least one receiving means for a base contact element for a screw connection. Moreover, the present invention relates to a connecting terminal having at least one spring-clamping means.

In connection with installation and industrial switching devices, in particular switching and protective devices such as contactors, motor protection switches, or the like, it is known to design connecting terminals with screw fixing and spring-clamping technology.

It is known from German Utility Model Patent DE 296 19 139 U1 to equip a connecting terminal with a cage clamp. To actually allow the clamping piece to be mounted in a switching device, no supporting segments can be arranged in the housing according to this design. In this connection, the installation is done from the front. The purpose of supporting segments is to absorb the forces occurring in the cage clamp. To eliminate this problem, the connecting piece features a punched-out retaining tongue. This requires an additional punching operation.

Such supporting segments exist in connecting terminals for bus bars as shown in German Utility Model Patent DE 93 15 474 U. Unlike the aforementioned terminal, the cage clamp is mounted from the side. In the case of switching devices, for example, contactors, this is not so easily possible. German Patent 197 56 751 C1 shows and describes a connecting terminal in which is located a bone-like retention piece around which is arranged the spring-tension clamp. Here too, the installation is carried out from the side. German Patent DE 43 21 067 C1 describes a connecting terminal for a printed-circuit board, featuring screw clamps which are arranged in steps, as shown in FIG. 6. German Patent DE 35 10 588 C2 shows a switching device featuring connecting terminals in screw technology.

Base contact elements which are arranged between separating segments are provided with a saw-toothing. Advantages ensue with respect to warehousing. This switching device is not intended for use of spring clamps.

SUMMARY OF THE INVENTION

Therefore, an object of the present invention is to provide a connecting terminal which is suitable for switching devices and which permits simple assembly, a further reduction in warehousing costs, while at the same allowing the use of both screw and clamping technology.

The present invention provides a connecting terminal for a switching device. The connecting terminal includes at least one receiving device configured to interchangeably receive either of a base contact element for a screw connection or a module for a spring-clamping device. A receiving shaft configured to engage the module is provided. The module includes an open mounting side configured for mounting the spring-clamping device.

The present invention not only makes the assembly easier because of the possibility of using preassembled modules but also simplifies the structural design of the cage clamp and the arrangement. Retaining tongues on the cage clamp which require an additional production step can be dispensed with. The modular design and faster installation times resulting from the present invention are advantageous. The present invention is based on the principle of identical parts or type case principle. It is also advantageous that both cage clamps and screw clamps can be used in a simple manner. A special cost reduction results from the fact that the basic housing, into which are inserted either the cage clamps or the screw clamps, can be jointly used. This reduces warehousing and production costs. No separate injection molds are required for the spring-clamping technology and the screw technology. Moreover, the present invention allows the two technologies to be integrated without additional expenditure. Moreover, by using the modules, it is advantageously possible to use standard cage clamps. The shape of the module can be adapted to the cage clamp design in a simple manner.

Due to the fact that the modules can be engaged in a receiving shaft, the electrical insulation requirements are fulfilled by the side walls of the receiving shaft. At the same time, it is possible, for example, to design the respective module in such a manner that it is open on one side.

Due to the arrangement inside the receiving shaft, the open side of the module is covered. The snap-in capability of the module simplifies the assembly. Therefore, it is particularly convenient if the module has snap-in noses which are able to snap into snap-in openings located in side walls of the receiving shaft.

It is particularly advantageous if the receiving shaft is at least partially open at a front side, the open front side being at least partially closed by a covering region or by a cover. This allows cable connection both from above and from the side.

The assembly of the module is simplified if the module has a covering region featuring guide ribs, the covering region being wider than the receiving shaft.

A particularly convenient embodiment of the module, a secure clamping technology and ease of electrical contacting are provided if the module has a contact piece located between a cage clamp and two supporting regions, a cable contacting chamber existing between the supporting regions, if the contact piece is brought out at the side opposite the cable opening side, if the contact piece has curved contact ends, and if the contact piece has a crank between its connecting end and the cable contact region, the connecting end being brought out of the module.

The connection of cables is made easier in that a cable connection chamber is provided next to the receiving means, the cable connection chamber being open at the bottom and suitable both for a connecting end of a cage clamp and for a connecting piece of a base contact element.

BRIEF DESCRIPTION OF THE DRAWINGS

The present invention will be described and illustrated in greater detail below based on exemplary embodiments with reference to the drawings, in which:

FIG. 17 is a front view of the completely assembled connecting terminal depicted in FIG. 13; and FIG. 18 shows a sectional view of the connecting terminal depicted in FIG. 13, however, completely assembled.

EMBODIMENT OF THE INVENTION

Figure 1:
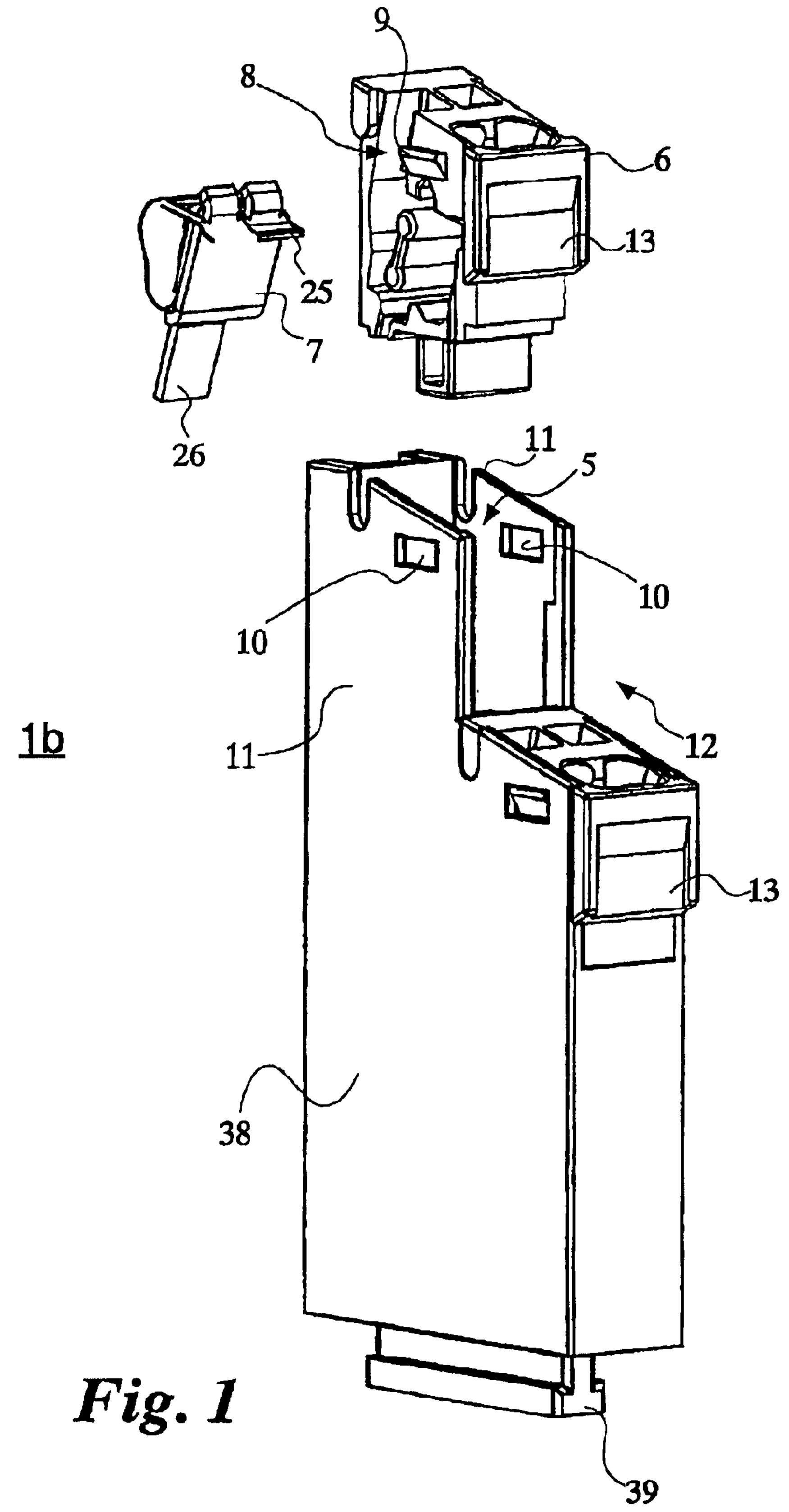
FIG. 1 is a perspective view of a connecting terminal, including a pulled-apart module and a pulled apart cage clamp.
Figure 2:
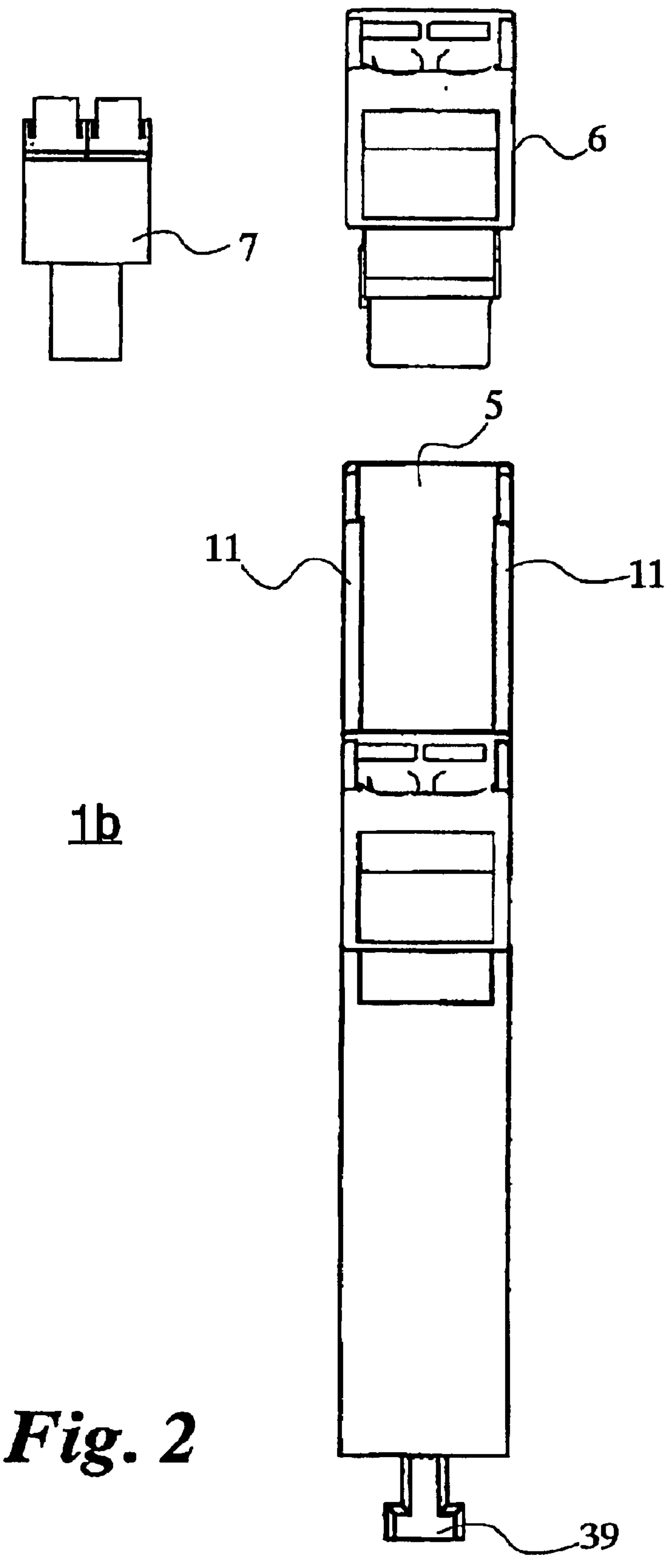
FIG. 2 shows a front view of the connecting terminal depicted in FIG. 1.

FIG. 1 shows a connecting terminal 1*b* including a spring-clamping means 7. The connecting terminal features a receiving shaft 5 in which a module 6 can be engaged. Spring-clamping means 7 is a cage clamp which is located in module 6. Connecting terminal 1*b* and clamp module 6 are further shown in FIGS. 2 through 12.

A connecting terminal la with a receiving means 2 for a base contact element 3 for a screw connection 4 is shown in FIGS. 13 through 18.

Figure 3:
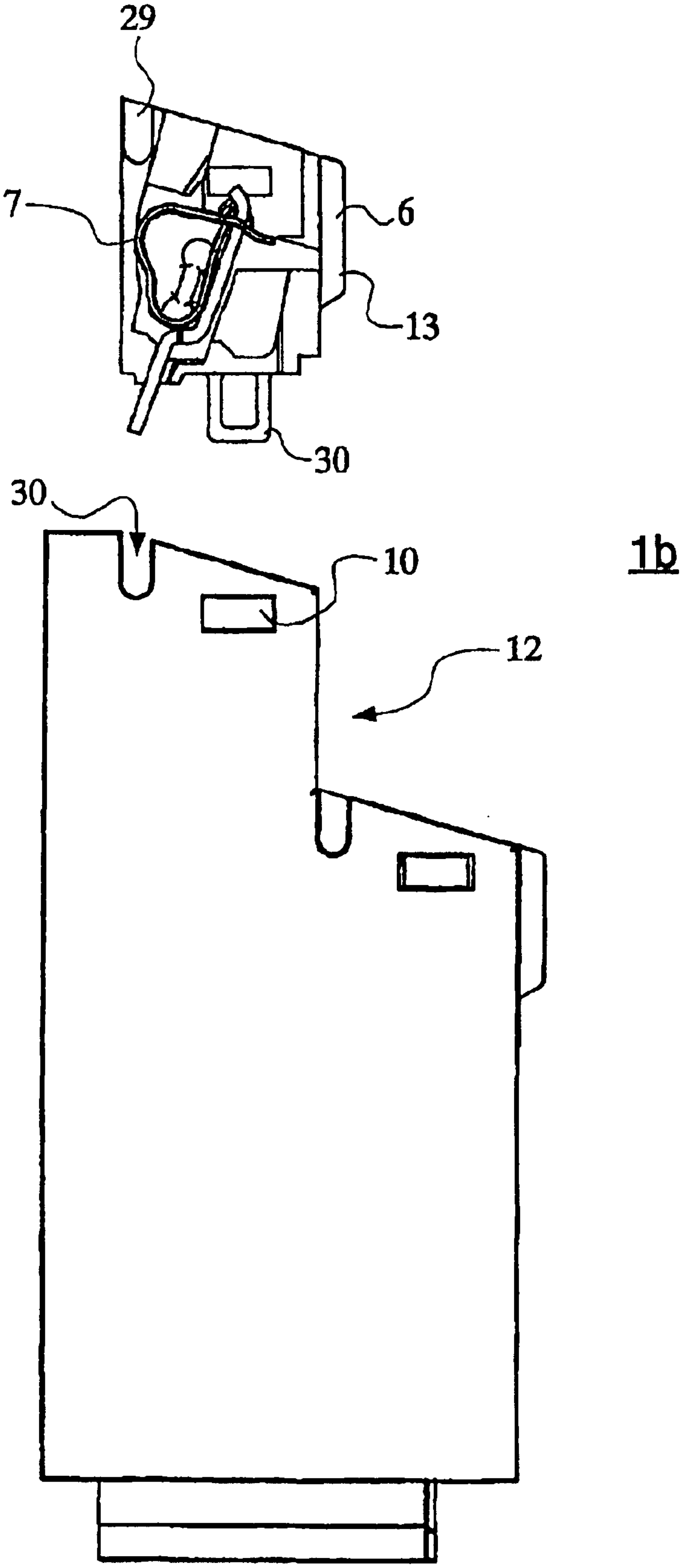
FIG. 3 is a lateral view of the connecting terminal depicted in FIG. 1 with the cage clamp being installed.
Figure 4:
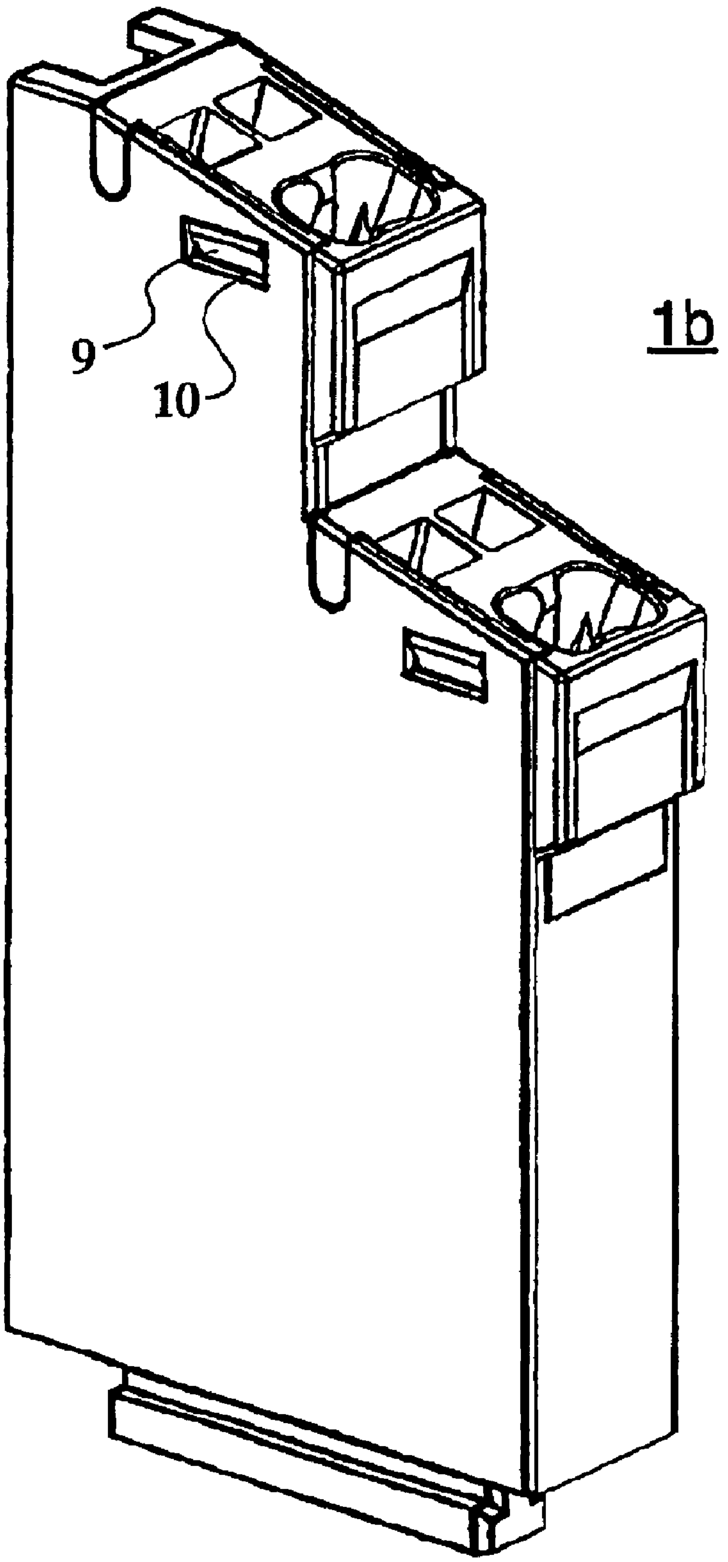
FIG. 4 shows a completely assembled connecting terminal depicted in FIG. 1.
Figure 5:
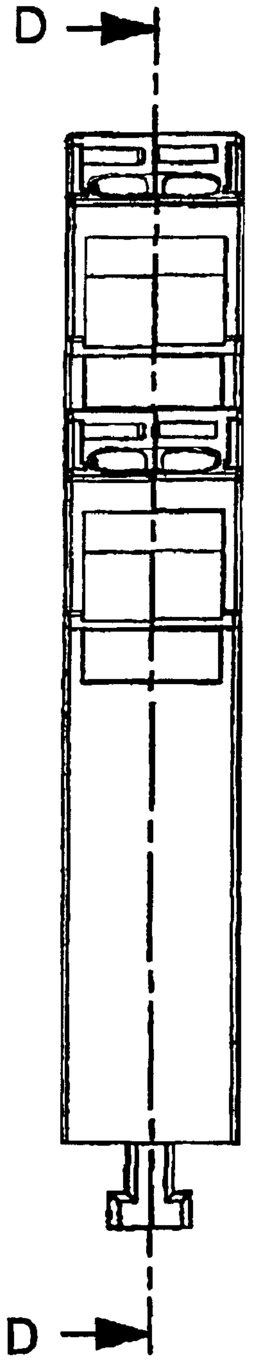
FIG. 5 is a front view of the completely assembled connecting terminal depicted in FIG. 1.
Figure 10:
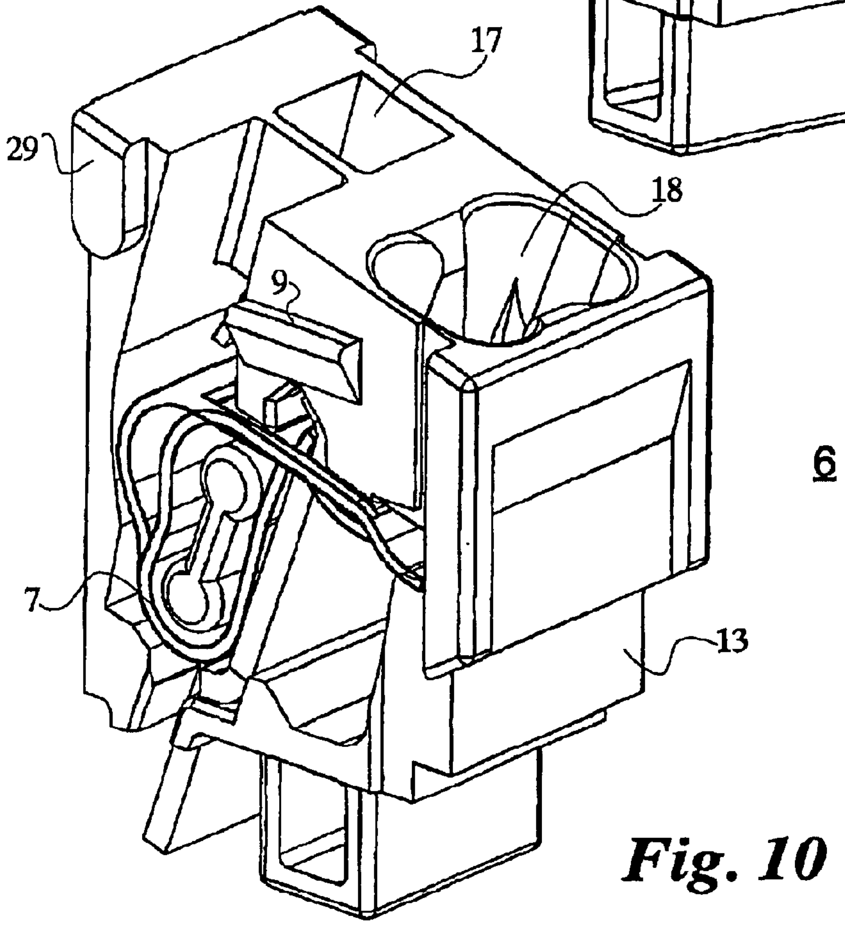
FIG. 10 is a perspective view of the module, including the cage clamp.

Screw connection 4 can easily be replaced with a module 6 which has spring-clamping means 7 located therein. Thus, it is possible to mount a screw or clamp connection, as desired. Module 6 is engaged in a receiving shaft 5 of connecting terminal 1*a* in a simple manner. To simplify assembly, module 6 has an open mounting side 8 from where spring-clamping means 7 can be mounted. Moreover, module 6 has snap-in noses 9, as shown in FIGS. 1, 4 and 10, which can be snapped into snap-in openings 10 located in side walls 11 of receiving shaft 5. Receiving shaft 5 is partially open at a front side 12, as clearly shown in FIG. 1; open front side 12 being closed by a covering region 13 which is depicted in FIG. 3. In the case of the screw clamp, open front side 12 is at least partially closed by a cover 14 which can be seen in FIGS. 15, 16 and 18. Moreover, module 6 has a covering region 13 featuring guide ribs 15, covering region 13 being wider than receiving shaft 5 as a result of which the module is inserted in a guided manner.

Figure 8:
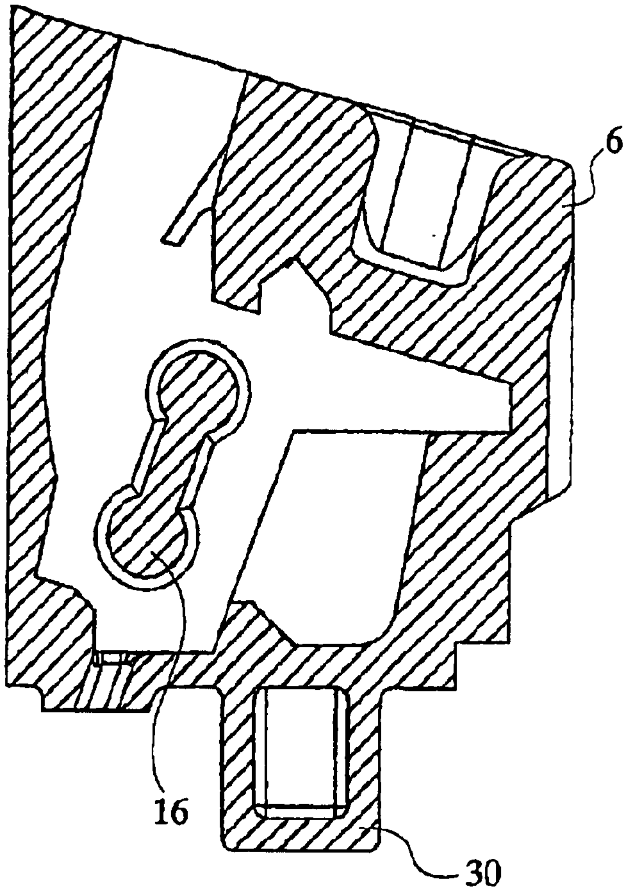
FIG. 8 is a sectional view of the module without cage clamp.
Figure 9:
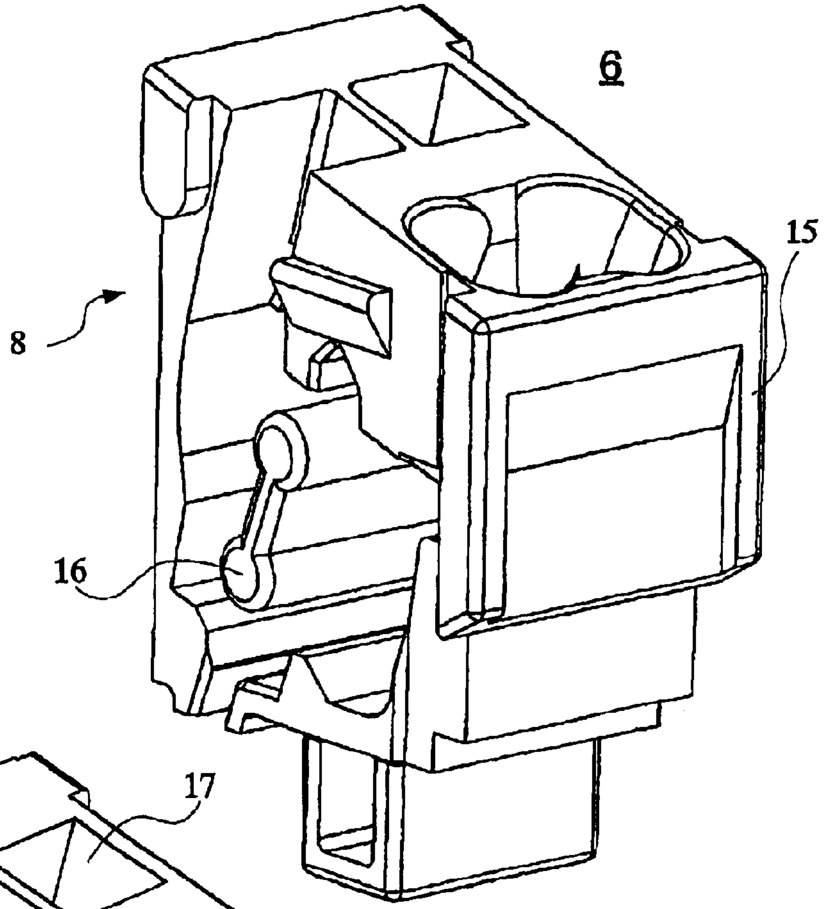
FIG. 9 is a perspective view of the module without cage clamp.

As shown in particular in FIGS. 8 through 10, module 6 has a per se known bone-shaped retaining projection 16 for cage clamp 7, one or more tool insertion openings 17 and one or more cable insertion openings 18 for introducing the cables from above. Cage clamp 7 is divided in such a manner that two cables can be clamped independently of each other.

Figure 11:
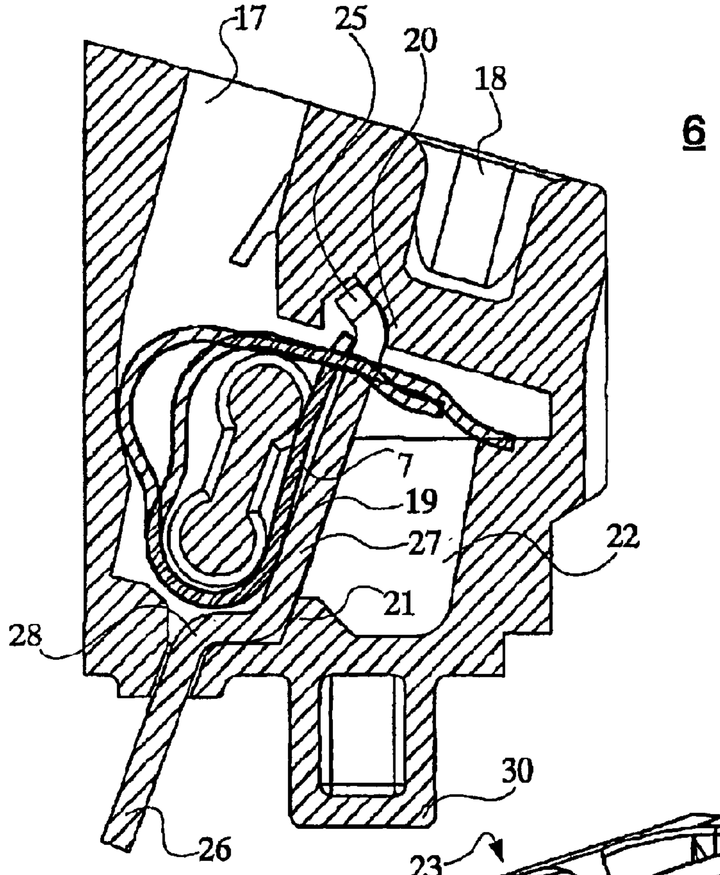
FIG. 11 is a sectional view of the module, including the cage clamp.
Figure 12:
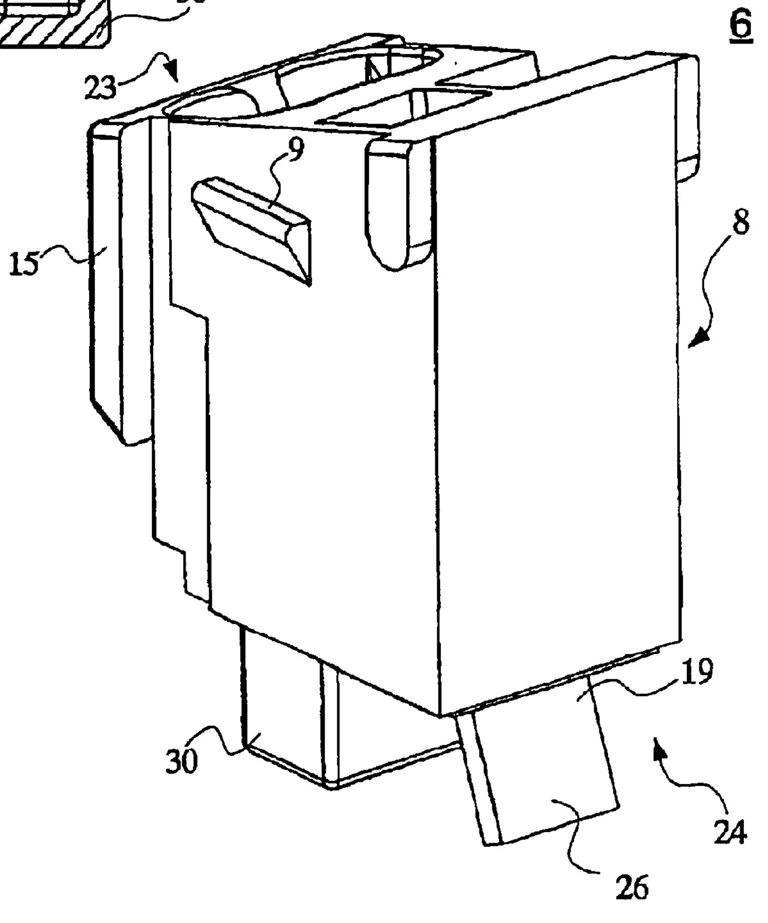
FIG. 12 is a perspective view of the module from a different angle.
Figure 13:
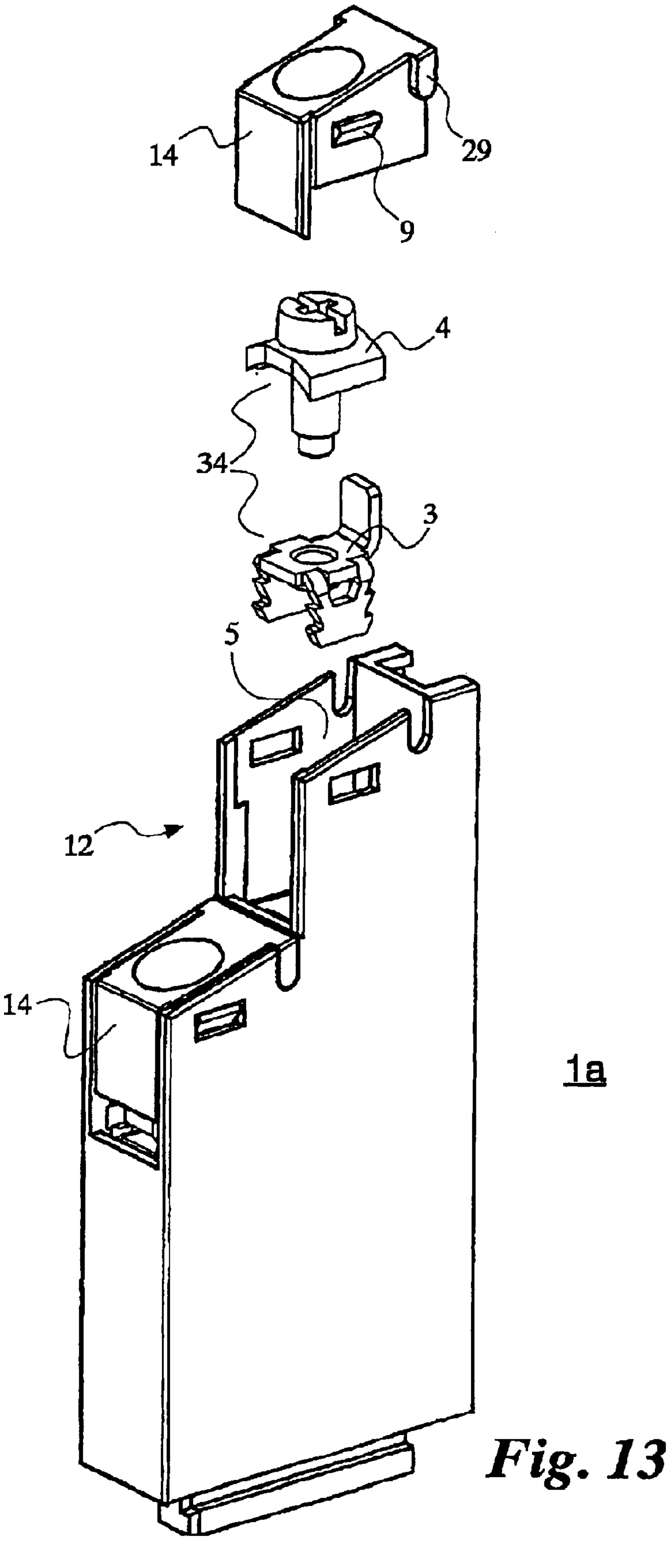
FIG. 13 is a perspective view of a connecting terminal, including a pulled-apart screw clamp and cover.
Figure 14:
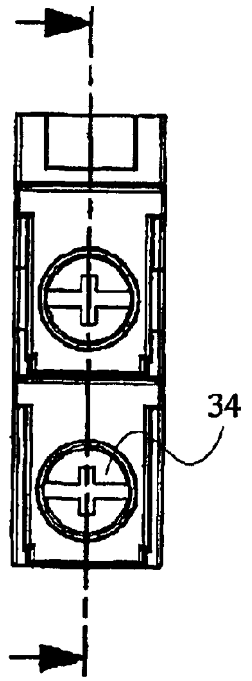
FIG. 14 shows a top view of the connecting terminal depicted in FIG. 13.
Figure 15:
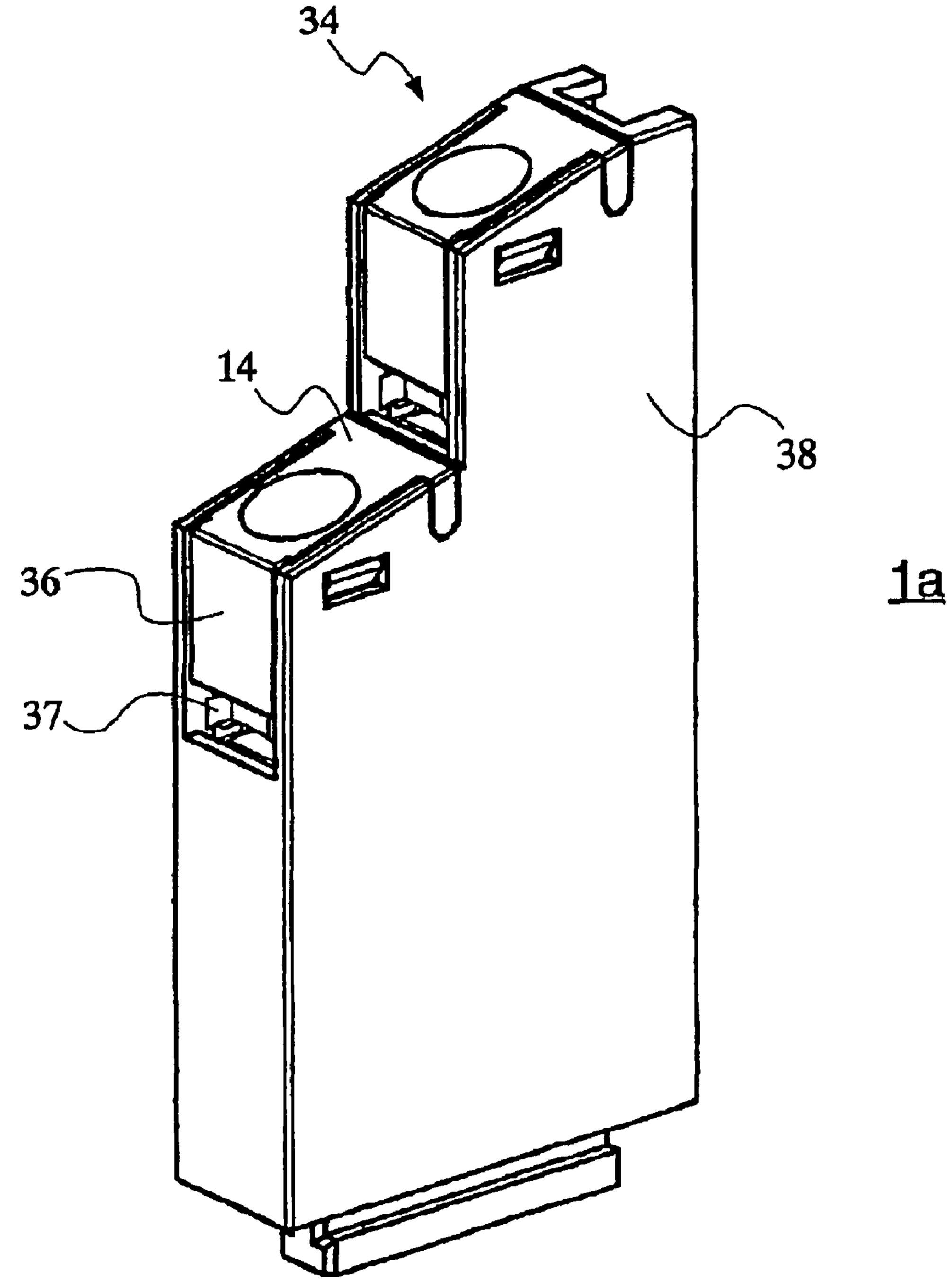
FIG. 15 shows a completely assembled connecting terminal depicted in FIG. 13.

To be able to absorb clamping forces and to allow the cage clamp to be mounted without difficulty, a contact piece 19, which is shown in FIG. 11, is arranged between cage clamp 7 and two supporting regions 20, 21, a cable contacting chamber 22 existing between supporting regions 20, 21 into which the cables can enter and be contacted in known manner, contact piece 19 being brought out at side 24 opposite cable opening side 23, as is also shown in FIG. 12.

Contact piece 19 has curved contact ends 25, which rest in a depression in the module housing. A crank 28 exists between connecting end 26 and cable contact region 27, connecting end 26 being brought out of module 6 as explained. Module 6 features first guide tenons 29 on the sides in the upper region of the module, the guide tenons corresponding with guide notches 30 located in side walls 11. To simplify the interchangeability of module 6 with screw clamps, a block-shaped guide extension 30 is arranged at the bottom, the guide extension being able to be connected to receiving means 2 in the form of an insertion cavity for base contact element 3.

Figure 6:
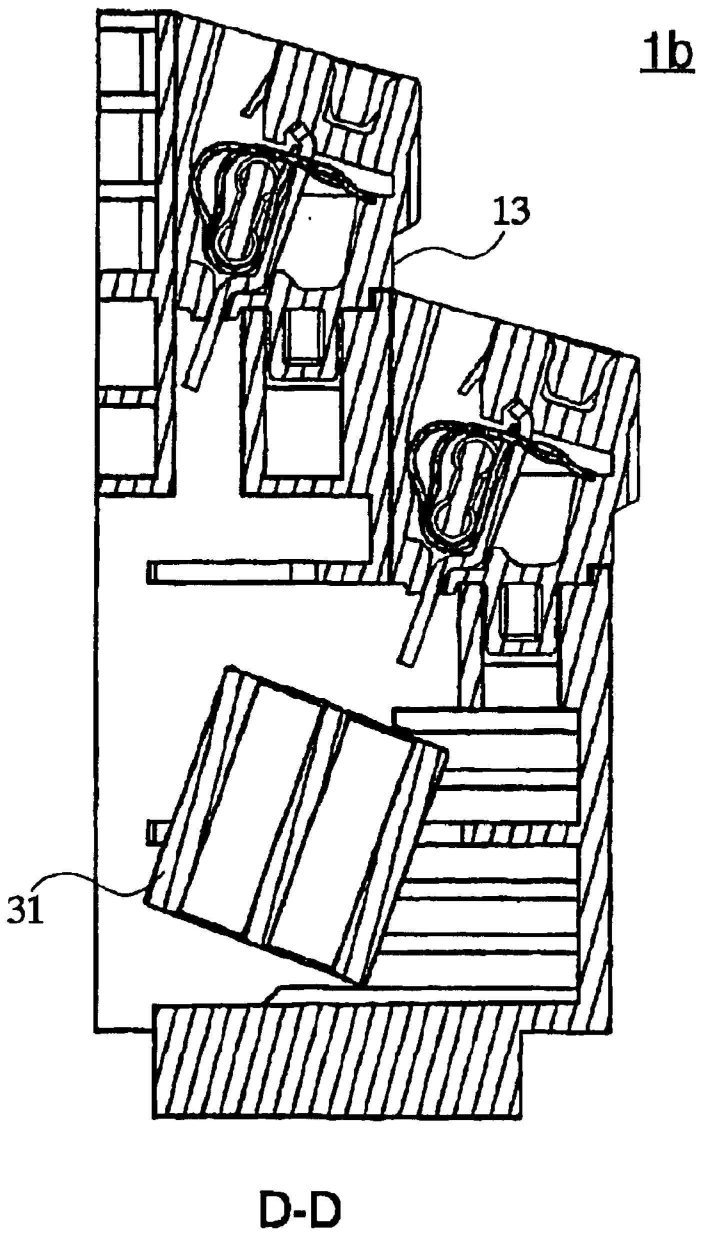
FIG. 6 is a sectional view of the completely assembled connecting terminal depicted in FIG. 1.
Figure 7:
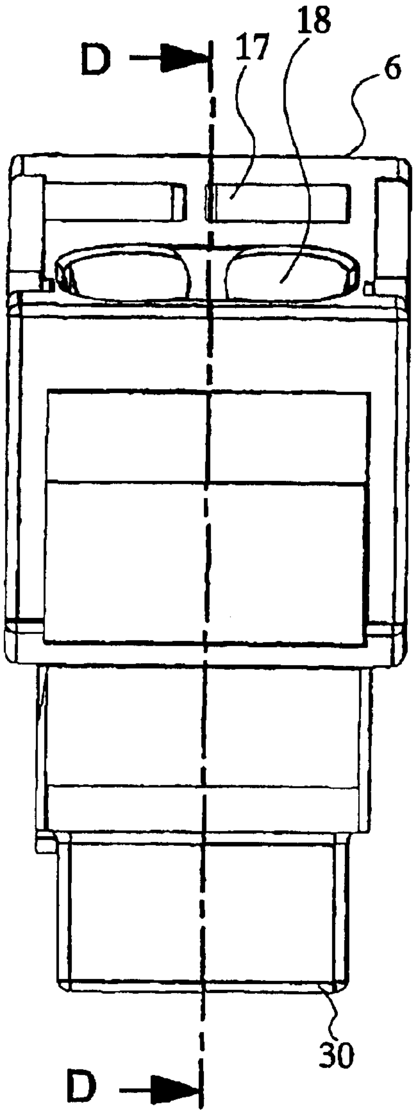
FIG. 7 is a front view of the module.
Figure 16:
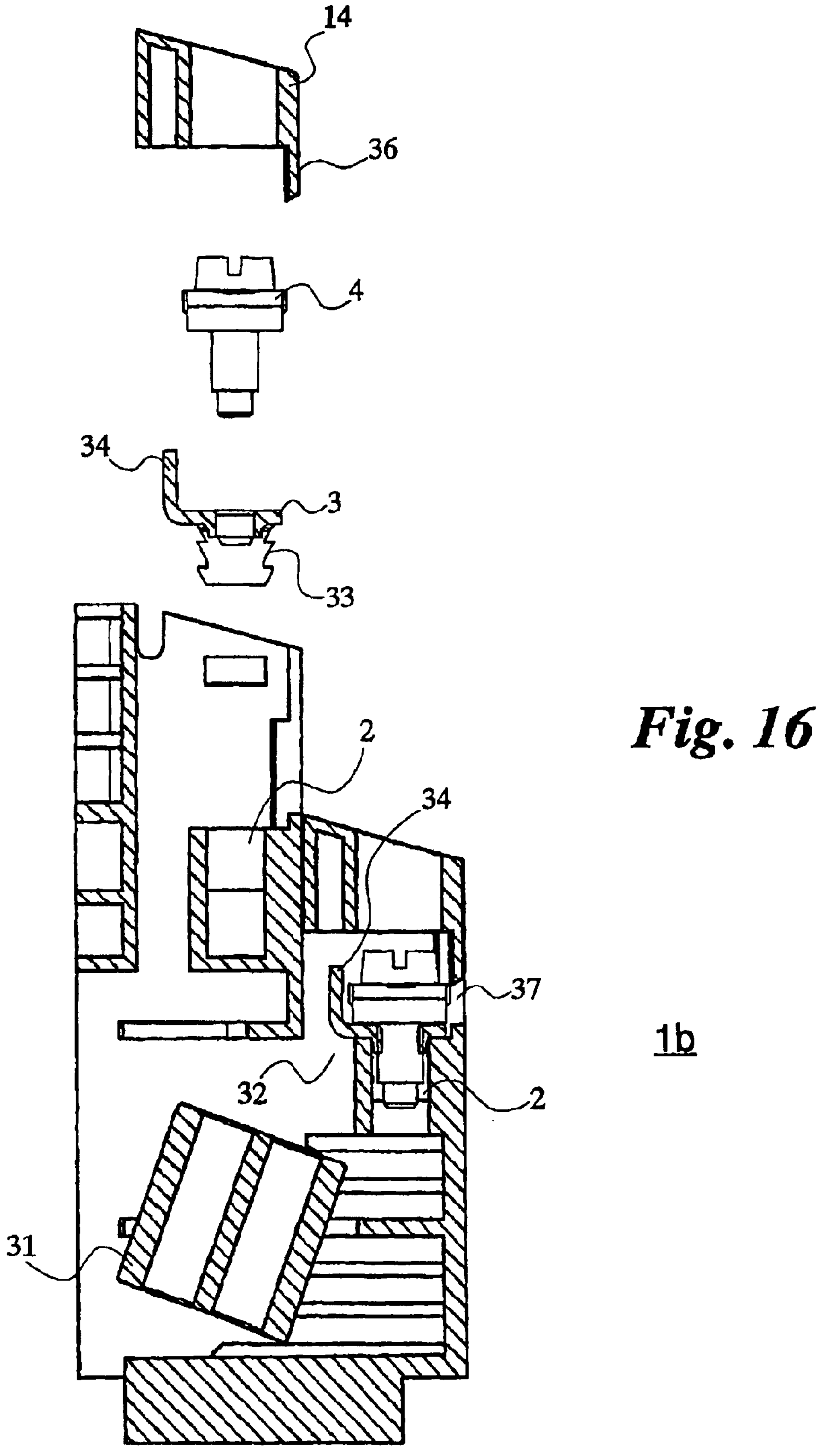
FIG. 16 shows a sectional view of the connecting terminal depicted in FIG. 13.

As shown in FIGS. 6 and 16, connecting terminal 1*a*, 1*b* features cable guides 31 below modules 6. This allows cables to be easily brought out without modules being installed. The cables can, for example, be soldered to connecting ends 26. After that, the modules can be installed. The same procedure is possible when using the screw clamps.

Base contact element 3 is provided with two fixing legs which each have a saw-toothing 33. The fixing legs are inserted into the cavities or receiving means 2. Next to receiving means 2, there exists a cable connection chamber 32 which is open at the bottom and is suitable both for a connecting end 26 of a cage clamp 7 and for a connecting piece 34 of a base contact element 3. Screw connections 4 or screw clamps 34 can be covered by a cover 14 featuring screw openings 35, cover 14 having snap-in noses 9 and guide tenons 29 which have an identical design to the snap-in noses 9 and guide tenons 29 of modules 6. Screw connections 4 of screw clamps 34 are provided with a cover 14 in such a manner that an insertion opening 37 for one or more cables exists, cover 14 having a covering surface 36 which is shorter in relation to front wall 12.

Connecting terminals 1*a*, 1*b* are provided with a T-shaped mounting rib 39 when connecting terminals 1*a*, 1*b* are separately arranged in contactors with a separate terminal housing 38. The connecting terminals can also be arranged in contactors side-by-side and in an integrated manner in a switchgear housing.

The present invention is not limited to the specific embodiments described above but is defined in scope by the attached claims. Thus, for example, the present invention can be complemented or replaced with other modules. For instance, it is possible to use a module which contains a screw/clamp combination. The terminals can also be used in other switching devices, in programmable control systems, I/O modules, and the like. Moreover, all features shown in the drawing, in particular, geometric features, belong to the present invention as well.

What is claimed is:

1. A connecting terminal for a switching device, comprising:

at least one receiving device configured to interchangeably receive either of a base contact element for a screw connection or a module for a spring-clamping device; and a receiving shaft configured to engage the module;

wherein the module includes an open mounting side configured for mounting the spring-clamping device.

2. The connecting terminal as recited in claim 1 wherein the spring-clamping device includes a cage clamp.

3. The connecting terminal as recited in claim 1 wherein the receiving shaft includes at least one snap-in opening disposed in side walls therein and the module includes at least one snap-in nose configured to snap respectively into the at least one snap-in opening.

4. The connecting terminal as recited in claim 1 wherein the receiving shaft is at least partially open at a front side, the front side being at least partially closed by a covering region when the module is received in the receiving device and being at least partially closed by a cover when the base contact element is received in the receiving device.

5. The connecting terminal as recited in claim 1 wherein the module includes a covering region having guide ribs, the covering region being wider than the receiving shaft.

6. The connecting terminal as recited in claim 1 wherein the module includes:

a bone-shaped retaining projection for a cage clamp;

at least one tool insertion opening; and at least one cable insertion opening.

7. The connecting terminal as recited in claim 1 wherein the module includes a contact piece disposed between a cage clamp and two supporting region and a cable contacting chamber being disposed between the two supporting regions, the contact piece including:

a crank between a connecting end and a cable contact region, the connecting end being brought out of the module at a side of the module opposite a cable opening side of the module; and curved contact ends.

8. The connecting terminal as recited in claim 1 further comprising side walls and wherein the module includes at one first guide tenon disposed on a respective side of the module in an upper region of the module, each of the at least one first guide tenon configured to cooperate with a respective guide notch disposed in a respective side wall.

9. The connecting terminal as recited in claim 1 wherein the module includes a block-shaped guide extension disposed at a bottom of the module and operatively connectable to the receiving device.

10. The connecting terminal as recited in claim 1 further comprising a least one cable guide disposed below the module.

11. The connecting terminal as recited in claim 1 wherein the base contact element includes at least one fixing leg having saw-toothing and being operatively connectable to the receiving device.

12. The connecting terminal as recited in claim 1 further comprising a cable connection chamber disposed adjacent the receiving device, the cable connection chamber being open at a bottom thereof and being configured to interchangeably receive either of a connecting end of a cage clamp and a connecting piece of the base contact element.

13. The connecting terminal as recited in claim 1 wherein:

the receiving shaft includes at least one first snap-in opening disposed in a respective side wall thereof and the module includes at least one first snap-in nose configured to snap respectively into the at least one snap-in opening;

the module includes at least one first guide tenon disposed on a respective side of the module in an upper region of the module, the at least one first guide tenon configured to cooperate with a respective guide notch disposed in the respective side wall; and the screw connection is part of a screw clamp and is capable of being covered by a cover including a screw opening, the cover including at least one second snap-in nose and at least one second guide tenon, the at least one second snap-in nose having a same shape as the at least one first snap-in nose and the at least one second guide tenon having a same shape as the at least one first guide tenon.

14. The connecting terminal as recited in claim 1 wherein:

the receiving shaft is at least partially open at a front side; and the screw connection is part of a screw clamp and is capable of being covered by a cover including a screw opening, the cover being shorter than the front side of the receiving shaft so as to provide an insertion opening for at least one cable.

15. The connecting terminal as recited in claim 1 wherein the connecting terminal is separately disposed in a contactor having a separate terminal housing.

16. The connecting terminal as recited in claim 15 further comprising a T-shaped mounting rib.

17. The connecting terminal as recited in claim 1 wherein the connecting terminal disposed in a contactor side-by-side with at least one other connecting terminal in an integrated manner in a switchgear housing.

18. The connecting terminal as recited in claim 1 wherein the spring-clamping device includes a cage clamp, the cage clamp being divided so that two cables are capable of being clamped independently of each other.

19. A connecting terminal system for a switching device, comprising:

a module including an open side configured for mounting a spring-clamping device; and at least one receiving device configured to interchangeably receive either of a base contact element for a screw connection or the module.

* * * * *